US009299157B2

(12) United States Patent
Lilje et al.

(10) Patent No.: US 9,299,157 B2
(45) Date of Patent: Mar. 29, 2016

(54) SCALE-INVARIANT SUPERPIXEL REGION EDGES

(71) Applicant: Environmental Systems Research Institute, Redlands, CA (US)

(72) Inventors: Anneliese Lilje, La Verne, CA (US); Jennifer Reiber Kyle, Sausalito, CA (US); Joseph McGlinchy, Redlands, CA (US)

(73) Assignee: Environmental Systems Research Institute (ESRI), Redlands, CA (US)

( * ) Notice: Subject to any disclaimer, the term of this patent is extended or adjusted under 35 U.S.C. 154(b) by 52 days.

(21) Appl. No.: 14/068,981

(22) Filed: Oct. 31, 2013

(65) Prior Publication Data

US 2014/0119656 A1 May 1, 2014

Related U.S. Application Data

(60) Provisional application No. 61/721,022, filed on Oct. 31, 2012.

(51) Int. Cl.
*G06K 9/34* (2006.01)
*G06T 7/00* (2006.01)

(52) U.S. Cl.
CPC ..... *G06T 7/0083* (2013.01); *G06T 2207/10032* (2013.01); *G06T 2207/20016* (2013.01); *G06T 2207/30184* (2013.01)

(58) Field of Classification Search
None
See application file for complete search history.

(56) References Cited

U.S. PATENT DOCUMENTS

| 6,542,638 | B2 | 4/2003 | Campbel | |
|---|---|---|---|---|
| 6,711,293 | B1 * | 3/2004 | Lowe | 382/219 |
| 6,778,698 | B1 | 8/2004 | Prakash | |
| 8,682,079 | B1 * | 3/2014 | Ouzounis | 382/190 |
| 2009/0148039 | A1 * | 6/2009 | Chen et al. | 382/165 |
| 2009/0316988 | A1 * | 12/2009 | Xu et al. | 382/173 |
| 2010/0272357 | A1 | 10/2010 | Maxwell et al. | |
| 2010/0328462 | A1 * | 12/2010 | Chen | 348/148 |

(Continued)

OTHER PUBLICATIONS

Ouzounis, Georgios K., and Pierre Soille. "Pattern spectra from partition pyramids and hierarchies." Mathematical Morphology and Its Applications to Image and Signal Processing. Springer Berlin Heidelberg, 2011. 108-119.*

(Continued)

*Primary Examiner* — Nirav G Patel
*Assistant Examiner* — Narek Zohrabyan
(74) *Attorney, Agent, or Firm* — Kilpatrick Townsend & Stockton LLP (57) ABSTRACT

Certain embodiments of the invention relate to a computer-implemented method that comprises analyzing an image over a plurality of different scales, where the analyzing includes determining spectral characteristics of the image at each of the plurality of different scales, determining spatial characteristics of the image at each of the plurality of different scales, and determining a segmentation pattern (i.e., superpixel) for the image at each of the plurality of different scales based on the spectral and spatial characteristics of that particular scale. The method further includes identifying objects in the image based on portions of the segmentation patterns that are scale-invariant over the plurality of different scales. In some cases, the method can include determining statistical, textural, and/or intensity characteristics of the image at each scale, where determining the segmentation patterns for the image at each scale is further based on one or more of these characteristics.

14 Claims, 9 Drawing Sheets

(56) References Cited

U.S. PATENT DOCUMENTS

| | | | |
|---|---|---|---|
| 2011/0116708 A1* | 5/2011 | Zhou et al. | 382/164 |
| 2012/0092357 A1 | 4/2012 | Wang et al. | |
| 2014/0063275 A1* | 3/2014 | Krahenbuhl et al. | 348/208.4 |

OTHER PUBLICATIONS

International Search Report for application PCT/US2013/067851 (Apr. 29, 2014).

Achanta, et al. "SLIC Superpixels Compared to State-of-the-art Superpixel Methods," IEEE Transactions on Pattern Analysis and Machine Intelligence 34:2274-2281( Nov. 2012).

Achanta et al. "SLIC Superpixels Compared to State-of-the-art Superpixel Methods" Journal of Latex Class Files 6:1-8 (Dec. 2011).

Ren et al. "Learning a classification model for segmentation," IEEE Proceedings of the 9th International Conference on Computer Vision 1:10-17 (2003).

International Report on Patentability for application PCT/US2013/067851 (May 14, 2015), 10 pages.

* cited by examiner

SCALE-INVARIANT SUPERPIXEL REGION EDGES

CROSS-REFERENCE TO RELATED APPLICATION

The present non-provisional applications claims benefit under 35 U.S.C. §120 for U.S. Provisional Patent Application No. 61/721,022, filed on Oct. 31, 2012, and entitled "Scale-Invariant Superpixel Region Edges," which is herein incorporated by reference in its entirety for all purposes.

BACKGROUND

Computer vision researchers have long sought efficient methods for segmenting discrete objects in an image while limiting the effects of both bias and variance. Conventional methods of image segmentation implement various image partition algorithms in order to segment out an image along contours extracted from the image at question. There are a number of standard algorithms which may be used to identify such contours, which typically focus on identifying pixel differences or discontinuities.

However, there are many known flaws with contemporary image segmentation techniques when used for identifying object boundaries on an image. For example, some image segmentation techniques often fail to accurately detect the complete boundary of an object, or a region's edge. Furthermore, standard techniques for edge detection (e.g., Canny Edge Detection) often fail to determine the full edge length on a shape when confronted with complex edges. The end result is that one must "piece together" a multitude of straight line segments to reconstruct the complex edge of an object. This process is further complicated when minor variations in pixel shading or vibrancy result in a significant number of discontinuities along an edge. Thus, modern edge detection methods fail by identifying false or incomplete edge patterns, which must then be manually rejected.

Some popular contemporary methods of image segmentation utilize machine learning, probability analysis, and expert guided learning. However, each of these methods suffers from both well-known bias and/or variance related errors. Moreover, such methodologies are often time consuming and computationally expensive. Thus, more accurate, efficient, and reliable image segmentation techniques are needed.

BRIEF SUMMARY

Embodiments of the present invention relate generally to image processing and segmentation techniques.

In some embodiments, Scale-Invariant Superpixel Region Edges (ScISR Edges) are used to efficiently segment an image in a way that can provide a methodology for classifying the totality of objects present in a scene. ScISR Edges can use a variety of data including image characteristics and image scale as a means to accurately, efficiently, and reliably segment images.

Certain embodiments of the invention relate to a computer-implemented method that comprises analyzing an image over a number of different scales, where the analyzing includes determining spectral characteristics of the image at each of the plurality of different scales, determining spatial characteristics of the image at each of the number of different scales, and determining a segmentation pattern (i.e., superpixel) for the image at each of the number of different scales based on the spectral and spatial characteristics of that particular scale. The method further includes identifying objects in the image based on portions of the segmentation patterns that are scale-invariant over the number of different scales. In some cases, the method can include determining statistical, textural, and/or intensity characteristics of the image at each scale, where determining the segmentation patterns for the image at each scale is further based on one or more of these characteristics. A range of the different scales can be based on a size of one or more target objects in the image.

In some embodiments, each of the segmentation patterns includes a plurality of segments, with each segment having a boundary (e.g., of adjacent pixels), such that identifying objects in the image can further include super-positioning the segmentation patterns determined at each of the number of different scales, and determining which of the boundaries (or portions thereof) are overlapping over the one or more of the super-positioned segmentation patterns, where the portions of the segmentation patterns that are scale-invariant correspond to the overlapping boundaries (or portions thereof).

In further embodiments, a computer-implemented system comprises one or more processors, and one or more non-transitory computer-readable storage mediums containing instructions configured to cause the one or more processors to perform operations that include analyzing an image over a plurality of different scales, where analyzing includes determining spectral characteristics of the image at each of the plurality of different scales, determining spatial characteristics of the image at each of the plurality of different scales, determining a segmentation pattern for the image at each of the plurality of different scales based on the spectral and spatial characteristics of that particular scale, and identifying objects in the image based on portions of the segmentation patterns that are scale-invariant over the plurality of different scales. A range of the different scales can be based on a size of one or more target objects in the image.

In some cases, systems can further comprise determining statistical characteristics, texture characteristics, and/or intensity characteristics of the image at each scale, where determining the segmentation pattern for the image at each scale is further based on one or more of the statistical, texture, or intensity characteristics. The segmentation patterns can be superpixels. In certain implementations, each of the segmentation patterns includes a plurality of segments, with each segment having a boundary (e.g., of adjacent pixels), such that identifying objects in the image can further include super-positioning the segmentation patterns determined at each of the plurality of different scales, and determining which of the boundaries (or portions thereof) are overlapping over the one or more of the super-positioned segmentation patterns, where the portions of the segmentation patterns that are scale-invariant correspond to the overlapping boundaries.

In certain embodiments, a non-transitory computer-program product, tangibly embodied in a machine-readable non-transitory storage medium, includes instructions configured to cause a data processing apparatus to analyze an image over a plurality of different scales, where analyzing includes determine spectral characteristics of the image at each of the plurality of different scales, determine spatial characteristics of the image at each of the plurality of different scales, determine a segmentation pattern for the image at each of the plurality of different scales based on the spectral and spatial characteristics of that particular scale, and identify objects in the image based on portions of the segmentation patterns that are scale-invariant over the plurality of different scales.

Some embodiments can further comprise instructions configured to cause the data processing apparatus to determine statistical, texture, and/or intensity characteristics of the image at each scale, where determining the segmentation pattern for the image at each scale is further based on one or more of the statistical, texture, and intensity characteristics of the image. In some implementations, each of the segmentation patterns includes a plurality of segments, with each segment having a boundary (e.g., of adjacent pixels), such that identifying objects in the image can further include superpositioning the segmentation patterns determined at each of the number of different scales, and determining which of the boundaries (or portions thereof) are overlapping over the one or more of the super-positioned segmentation patterns, where the portions of the segmentation patterns that are scale-invariant correspond to the overlapping boundaries (or portions thereof). A range of the different scales can be based on a size of one or more target objects in the image.

According to certain embodiments, a computer-implemented method includes receiving an image (or a number of images) of a region of interest and receiving an input corresponding to a plurality of scales. For each of the plurality of scales, determining a segmentation pattern to divide the image into a plurality of segments, each segment including a boundary containing a plurality of adjacent pixels, where the step of determining a segmentation pattern is performed based on at least one characteristic of pixels of the image and the particular scale. The method further includes generating a segmentation pattern for each of the plurality of scales, detecting scale-invariant boundaries or portions thereof over two or more of the segmentation patterns, and identifying objects based on the scale-invariant boundaries. Some characteristics of pixels that can be used to determine a segmentation pattern include intensity characteristics, spectral characteristics, spatial characteristics, texture characteristics, and statistical characteristics. It should be noted that the boundary does not have to be defined by pixels and may, in some cases, be defined by a vector feature. In some embodiments, multiple images may be used and integrated using ScISR edge techniques, as would be appreciated by one of ordinary skill in the art with the benefit of this disclosure.

DETAILED DESCRIPTION

Embodiments of the present invention generally relate to aspects of image processing, segmentation techniques, and object extraction.

Photographic images (e.g., aerial photos of buildings) can have contours of varying complexity, from simple polygons (e.g., rectangles, circles) to shapes of high complexity, where the image is composed of a number of pixels. In digital imaging, a pixel can be a physical point in a raster image, or the smallest addressable element in a display device. Each pixel can be a sample of an original image, with more samples typically providing a more accurate representations of the original.

In computer vision and imaging, image segmentation is the process of partitioning a digital image into multiple segments, which may include a number of pixels with similar characteristics that are grouped together into a segment or individual bounded region that can be referred to as a "superpixel." Some of these characteristics can include spectral, spatial, texture, intensity characteristics, or the like. Thus, adjacent segments may be markedly different with respect to one or more image pixel characteristics (e.g., spectral characteristics), as would be appreciated by one of ordinary skill in the art. One purpose of image segmentation is to simplify the representation of an image into something that is easier to computationally analyze. Image segmentation is typically used to locate objects and boundaries (e.g., lines, curves, etc.) in images. In some embodiments, image segmentation is the process of assigning a label to every pixel in an image, or a subset thereof, such that pixels with the same label share certain visual characteristics. The result of image segmentation is a set of segments or superpixels that collectively cover the entire image, or a set of contours extracted from the image.

Furthermore, superpixels can be used in image segmentation to significantly reduce the quantity of data that must be processed and present the image in a structure more representative of the scene such that object delineation and extraction can commence. For example, superpixels can be created by consolidating local and spectrally similar regions of pixels into individual bounded regions, which may be require less computational resources to process than the sum of the pixels in the region. Significant differences between, e.g., spectral characteristics of neighboring superpixels, can be interpreted as representing different objects in the scene. As such, superpixels can be utilized, in conjunction with the other methods described herein, to segment an outer boundary of an object of any arbitrary shape and size.

Identifying objects in an image using methods and systems limited to superpixel segmentation analysis can improve object extraction and recognition accuracy in image analysis, but may present inaccuracies in identifying and extracting objects in images with complex features, and can be wholly ineffective in identifying objects or features contained within a superpixel. In certain embodiments, superpixel segmentation is performed at a plurality of different scales. The superpixel segmentations from each scale can be aggregated (e.g., superimposed) and then analyzed to identify scale-invariant features or regions. In other words, superpixel region edges that overlap over two or more scales are wholly or partially scale-invariant, such that those edges appear at more than one scale. These superimposed scale-invariant superpixel region edges (ScISR Edges) can be used to efficiently segment an image in a way that can provide a methodology for classifying the totality of objects present in a scene. ScISR Edges can use a variety of data including image characteristics and image scale as a means to accurately, efficiently, and reliably segment images.

Figure 1A:
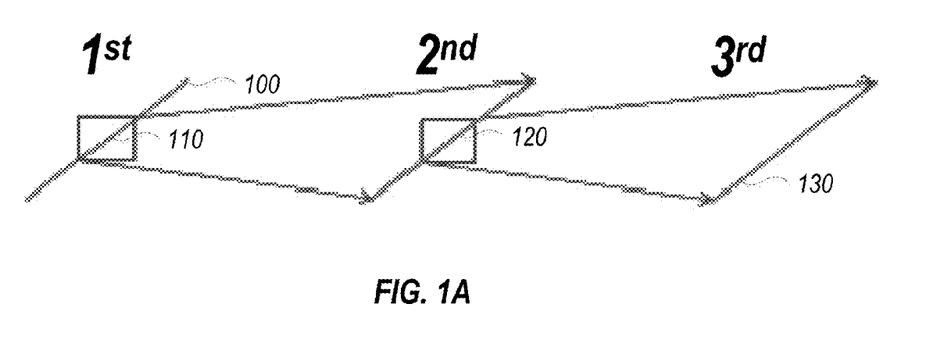
FIG. 1A illustrates the concept of scale invariance of a line over a number of different scales.
Figure 1B:
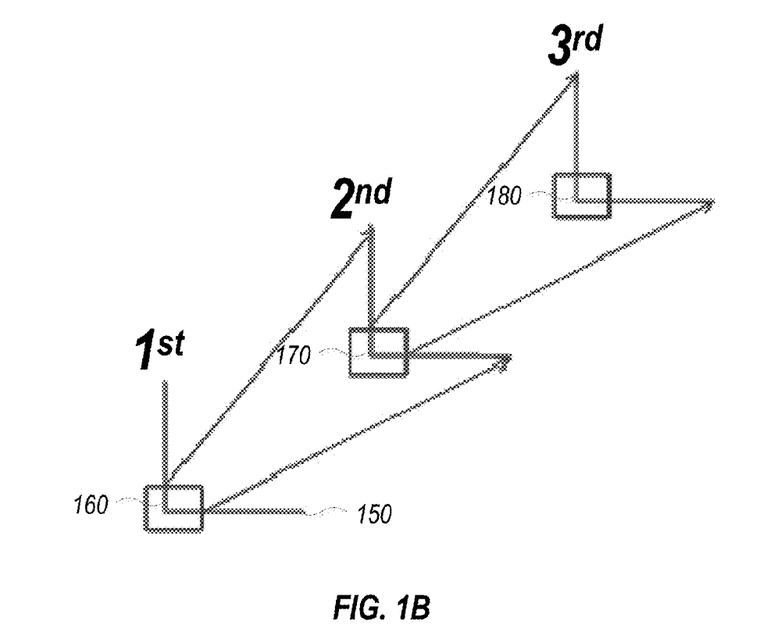
FIG. 1B illustrates the concept of scale invariance of a right angle or corner over a number of different scales.

Concepts of scale invariance are illustrated in FIGS. 1A and 1B. FIG. 1A illustrates the concept of scale invariance of a line 100 over a number of different scales. At a first scale, line segment 110 of line 100 is enlarged to a second scale, and line segment 120 of line segment 110 is further enlarged to a third scale (line segment 130). FIG. 1B illustrates the concept of scale invariance of a right angle or corner over a number of different scales. At a first scale, corner portion 160 of corner 150 is enlarged to a second scale, and corner portion 170 of corner portion 160 is further enlarged to a third scale (corner 180). In each case, as the line or corner is enlarged (or reduced), the dimensions remain the same, such that the line remains a line and the corner remains a corner at any scale. Thus, scale-invariant features, such as lines and corners, that do not change their geometry despite their changes in scale (e.g., squares, rectangles, etc.) and are typically the easiest to differentiate from background features. It should be noted that these are simple cases for the purposes of illustration and some object edges may be scale-invariant over a finite range of scales, or may exhibit scale-invariant-like properties such that segments may partially overlap or overlap according to a predetermined criteria, as would be appreciated by one of ordinary skill in the art.

Any range or number of scales can be used to identify ScISR edges and extract objects. Two parameters that can affect a segmentation pattern are scale (i.e., superpixel size) and compactness (i.e., regularization). Scale can be used to set a desired size of a segmentation region (e.g., superpixel). Scale can be used in the initial formation of the segments, where the image is divided uniformly (or substantially uniformly) into segments of a size set by the scale parameter. For example, if the scale is set to ¼ the size of an image and the segmented image is uniform (i.e., no spectral information is present), the image will be segmented into four superpixels. Compactness refers to the weight applied to the spatial information as compared to the spectral information. For instance, if compactness is set very large (e.g., 1000), segmentation may be largely insensitive to spectral information and the resulting segmentation pattern will be similar to the result of segmenting a uniform image. If compactness is set very small (e.g., 1e-7), the resulting segmentation pattern may be very non-uniform and will consist of very irregularly-shaped regions. Setting the scale is similar to setting the number of segmentation regions in an image. Increasing scale can result in a smaller number of larger segmentation regions while decreasing scale can result in a greater number of smaller segmentation regions. Increasing compactness can result in segmentation regions of a more uniform shape (e.g., approaching circular) that typically will not follow irregular boundaries as well while decreasing compactness can result in segmentation regions of very flexible shape that may closely follow variations in pixel characteristics.

In alternative embodiments, images with different levels of magnification can be used (in addition to scale) in the image segmentation and object identification process. Thus, identifying a relatively large target object in an image using ScISR edges may use zoom scales of relatively low magnification to accurately capture its dimensions, according to an exemplary embodiment. Likewise, relatively small objects can use zoom scales of relatively high magnification to accurately capture its dimensions. In some cases, the number of scales used, the magnification levels used, and the range of magnification can affect the resulting accuracy of the resulting extracted (identified) object, as would be appreciated by one or ordinary skill in the art with the benefit of this disclosure.

In one implementation, an initial superpixel segmentation pattern is generated at a first scale (e.g., factor of 10), with the superpixel segments based on spatial and spectral pixel characteristics. Some ranges of scales may better suited to capture certain objects that other ranges of scales. In a first pass, a first range of scales (e.g., 10, 11, 12 ... 30) may yield an inaccurate representation of a target object. In a second pass, a more appropriate range may be determined (e.g., 100, 105, 110 ... 150) that reproduces the target image using segmentation with high precision. Thus, the range of scales and the steps between scales can affect the accuracy of the segmentations, as well as the aggregation of segmentations with respect to an image and/or individual target elements (e.g., buildings, streets) of the image.

In addition to superpixel edges, superpixel regions can also be analyzed. For example, average pixel values inside a region can be based on variations, textures, color value distribution, etc. In some embodiments, superpixel regions may be comprised of smaller superpixels inside it with scale-invariant features that can represent other objects. Typically, smaller superpixel regions inside large superpixel regions are the result of the aggregation of segmentation patterns over a number of scales or compactness factors.

ScISR edges can be used in 3D models comprised of voxels in similar ways. For example, some embodiments can analyze a number of 2D slices of the 3D image to identify objects based on voxel characteristics. Alternatively, aggregations of different viewpoints may yield scale-invariant features. Applying the principles of ScISR edges to 3D images for object identification and extraction would be understood by one of ordinary skill in the art with the benefit of this disclosure.

Figure 2:
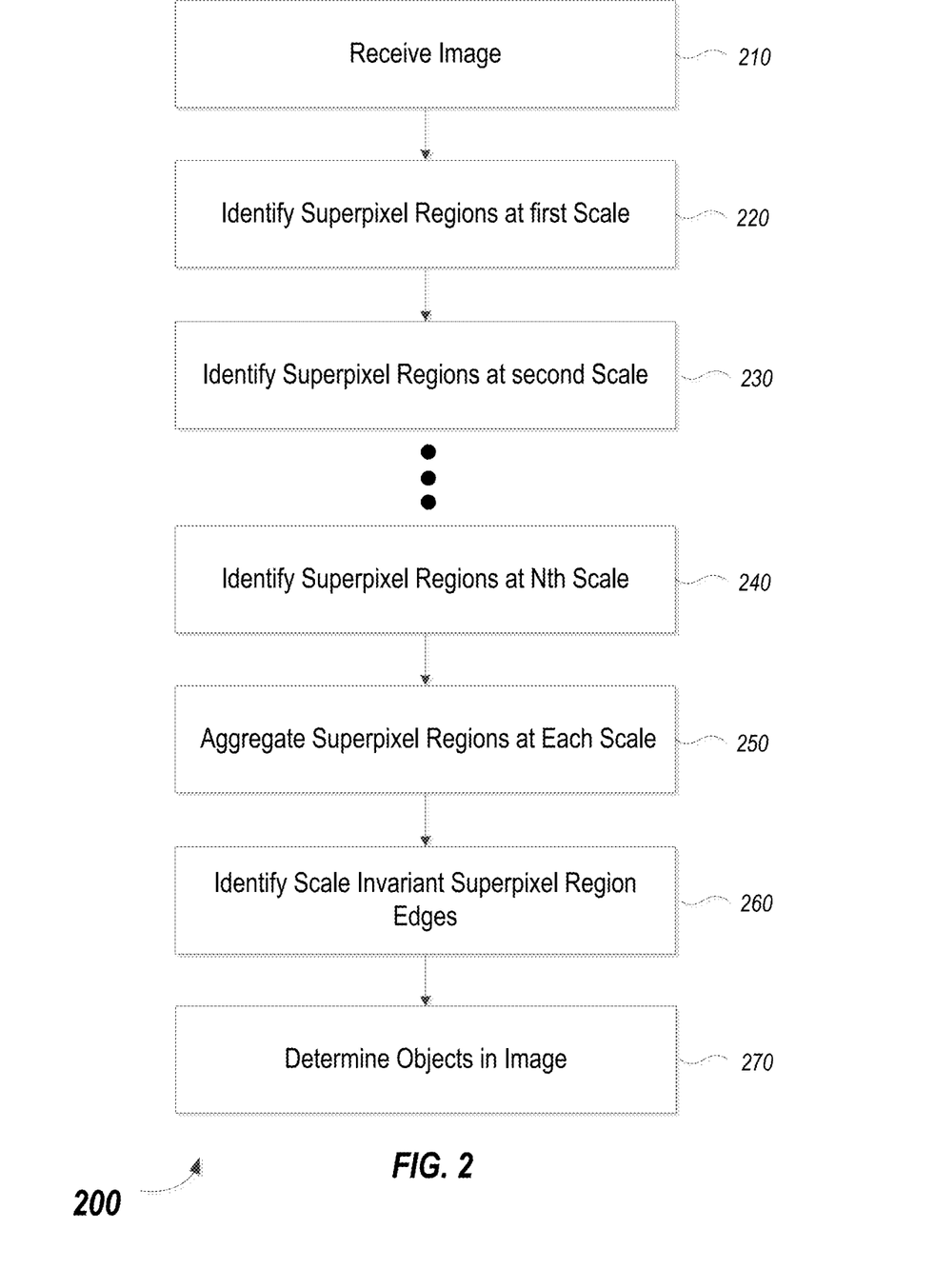
FIG. 2 a simplified flow diagram illustrating aspects of a method for identifying objects in an image using scale-invariant superpixel region edges (ScISR), according to certain embodiments of the invention.

FIG. 2 depicts a simplified flow diagram illustrating aspects of a method 200 for identifying objects in an image using scale-invariant superpixel region edges (ScISR), according to certain embodiments of the invention. Method 200 can be performed by processing logic that may comprise hardware (e.g., circuitry, dedicate logic, etc.), software (e.g., executed on a general purpose computing system or a dedicated machine), firmware (e.g., embedded software), or any combination thereof. In some embodiments, method 200 can be performed by elements of system 900 or system 1000 of FIGS. 9-10.

Method 200 begins with receiving an image (210) and identifying a segmentation pattern of superpixel regions (220) on the image based on a first scale (e.g., specified size of superpixel segments). The superpixel segments (i.e., grouped pixels) can be determined based on one or more pixel characteristics (e.g., spectral, spatial, intensity characteristics, etc.). The resolution of the image can affect the accuracy of object identification. In some instances, pixel characteristics may be more readily discernible with very high resolution images (i.e., small pixels) than low resolution images (i.e., large pixels). For example, two adjacent objects in an image may have very similar spectral characteristics (e.g., color) with markedly different textures. High resolution images may clearly delineate the boundary between the adjacent objects because the pixels are small enough to capture an accurate location of the texture differences. On the other hand, low resolution images may contain pixels large enough to straddle the boundary, such that the texture characteristics are aggregated within the individual pixel. This may render the processing logic unable to identify the border between the object, or identify an offset border once the given characteristics are readily discernible.

Method 200 proceeds with identifying segmentations patterns of superpixel regions at a second scale (230) and continues on until the nth scale (240). The number of scales used, the range of scales, and the step size between scales can be varied to best capture the target objects. For example, a certain combination scales may be used to identify a large number of buildings on an aerial image of a city, while a different combination of scales may be used to identify small features (e.g., windows, arches, domes, walkways, etc.) local to a small group of buildings. The preferred combinations and permutations would be understood by those of ordinary skill in the art with the benefit of this disclosure.

Method 200 continues with aggregating the patterns of superpixel regions at each scale or a subset thereof (250) and identifying scale-invariant superpixel region (ScISR) edges based on the aggregated segmentation patterns (260). To illustrate this process, each scale may have a different segmentation pattern than the other scales. As each segmentation pattern of superpixels are aggregated and superimposed over one another, certain segment edges may begin to overlap each other. The segment edges that overlap across multiple scales tend to be scale-invariant. For example, a straight line (e.g., aerial view of an edge of a building) will still appear to be a straight line regardless of scale. ScISR edges tend to have more overlapping edges across scales than edges that do not exist across multiple scales, and as a result the ScISR edges can be readily identified by processing logic.

Method 200 concludes with determining one or more objects in the image based on the overlapping ScISR edges (270). Superpixel edges that do not exist at multiple scales (or compactness factors) can be ignored (or assigned a low priority), leaving a number of ScISR edges that can accurately correspond to the boundaries of objects in the image. Typically, man-made structures such as buildings, roads, and other artificial constructs, comprise more scale-invariant features (straight lines, corners, etc.) than natural objects (e.g., trees, rocks, etc.), making them easier to detect. In some case, scale-invariance may exist over some, but not all scales or compactness factors.

As noted above, two parameters that can affect a segmentation pattern are scale (i.e., superpixel size) and compactness (i.e., regularization). Scale can be used to set a desired size of a segmentation region (e.g., superpixel). Scale can be used in the initial formation of the segments, where the image is divided uniformly (or substantially uniformly) into segments of a size set by the scale parameter. Setting the scale is similar to setting the number of segmentation regions in an image. Compactness refers to the weight applied to the spatial information as compared to the spectral information. In some cases, scale can be identified by pixel array dimensions, which can dictate the starting size of each superpixel. For example, one particular scale can be set to 100×100 pixels.

It should be noted that different scales may use a variety of different spectral characteristics (e.g., intensity, color, etc.), texture characteristics, statistical characteristics, or any suitable pixel characteristic, over a particular scale or range of scales (or compactness factors). There are a myriad of combinations of factors, settings, and pixel characteristics that may yield highly accurate object identifications, as would be appreciated by those of ordinary skill in the art with the benefit of this disclosure. In some cases, multiple images may be used instead of one master image. For example, multiple images of a scene or landscape can be analyzed using ScISR edges where objects can be extracted based on interpolating the size and location of objects between images. Furthermore, it should be noted that the boundaries do not have to be defined by pixels and may, in some cases, be defined by a vector feature, as would be appreciated by one of ordinary skill in the art with the benefit of this disclosure.

In some embodiments, image characteristics can include, but are not limited to, spectral data, image intensity data, texture data, statistical data, and spatial data. In some cases, a user can select the "size" (e.g., a measure of area in pixels) of the object to be segmented from the image. Specifying a target area (e.g., a group of buildings) may help improve the accuracy of object identification or help determine an appropriate number, magnification, and step size (e.g., difference of magnitude between scales) between scales. For example, a range of scales may be selected based on a target object (e.g., building) being the base scale, with the range spanning 5 scales above and 5 scales below the target object. To further illustrate this concept, if a box is drawn around a building (e.g., manually or through automation), it indicates (1) that a target object exists in side the box—a clue that the system can use to find the image characteristics and segmentation patterns that identify that object, and (2) provides basic information about the size of the object relative to the image pixels (e.g., a building is approximately equal to but less than 500× 500 pixels. Moreover, the creation of a foundation of segmented objects can be used to support the efficient and immediate modeling of more advanced 3-dimensional structures or similar classification schemes.

It should be appreciated that the specific steps illustrated in FIG. 2 provide a particular method of identifying objects in an image using ScISR edges, according to an embodiment of the present invention. Other sequences of steps may also be performed according to alternative embodiments. In certain embodiments, method 200 may perform the individual steps in a different order, at the same time, or any other sequence for a particular application. For example, alternative embodiments may include additional steps to identify and differentiate pixel characteristics and compare multiple aggregated segmentation patterns based on different combinations of pixel or image characteristics. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method.

Figure 3:
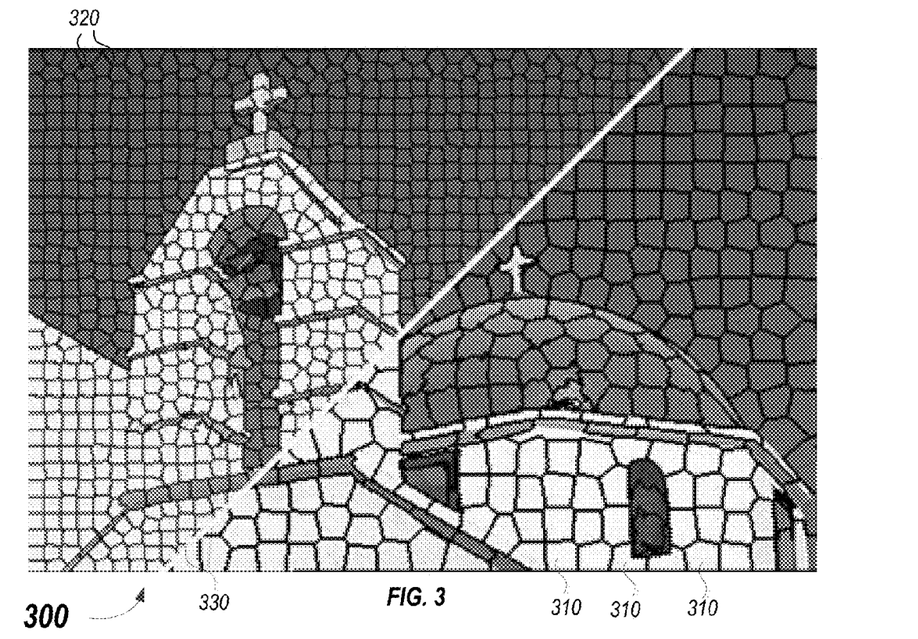
FIG. 3 is a diagram illustrating the concepts of image segmentation and superpixel generation, according to certain embodiments of the invention.

FIG. 3 is an image 300 illustrating the concepts of image segmentation and superpixel generation, according to certain embodiments of the invention. Image 300 depicts a domed church with a blue sky background. Image 300 comprises of a number of adjacent pixels grouped into superpixels (i.e., segments) 310, 320 that have one or more similar pixel characteristics. As discussed above, superpixels provide a computationally efficient method for transforming a high-bandwidth pixel-grid structure into a significantly lower bandwidth segmented structure, such as that shown in image 300. In some embodiments, superpixel algorithms can be sensitive to slight variances in pixel characteristics (e.g., color, intensity, etc.) for any arbitrary object. For example, two adjacent objects with one or more sufficiently different spectral characteristics may include separate superpixels regions with shared edges that mark this boundary. The dividing line 330 is used to illustrate how an image can include superpixel segments of different sizes. Superpixels 320 may be smaller than superpixels 310 because the image segmentation algorithm was implemented at a different scale, pixel characteristics were evaluated at a different sensitivity, or a combination of both. As clearly seen in FIG. 3, both segmentation patterns clearly delineate the church from the sky, as well the different features that are part of the church, such as the windows, arches, corners, and other architectural elements. It should be noted that some embodiments may utilize multiple scales within the same segmentation pattern. For example, some regions of an image may be associated with a first scale and other regions may be associated and analyzed with a second scale within the same segmentation pattern. Furthermore, some segmentation patterns may be discontinuous. For example, only portions of an image may be segmented.

Figure 4:
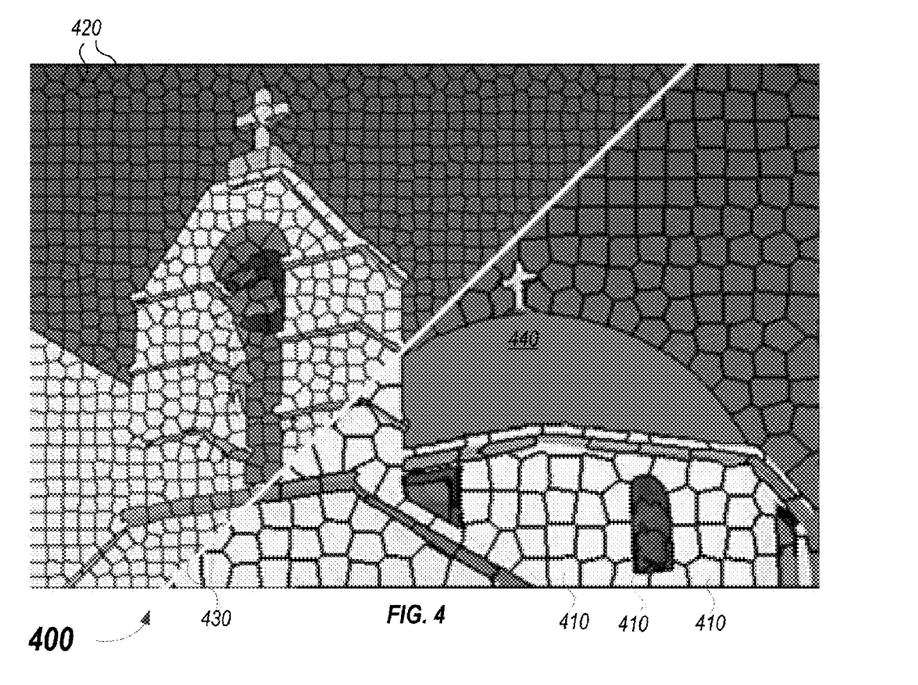
FIG. 4 is a diagram illustrating the concept creating larger superpixels based on a plurality of smaller superpixels, according to certain embodiments of the invention.

FIG. 4 is an image 400 illustrating the concept of creating larger superpixels based on a plurality of smaller superpixels, according to certain embodiments of the invention. Image 400 depicts the same domed church with blue sky background as shown in FIG. 4 and comprises a number of adjacent pixels grouped into superpixels (i.e., segments) 410 that have one or more similar pixel characteristics. Dividing line 430 is used to illustrate how an image can include superpixel segments of different sizes. Superpixels 420 may be smaller than superpixels 410 because the image segmentation algorithm was implemented at a different zoom scale, pixel characteristics were evaluated at a different sensitivity, or a combination of both. By way of example, FIG. 4 illustrates the concept of superpixels that have been aggregated to extract the dome 440 of the building as a larger superpixel region. In other words, dome 440 is a superpixel comprised of smaller superpixels. The process of going from a segmented image to a delineated and discrete object in a scene is called object extraction. However, most real-world objects are rarely as straightforward as the superpixel segmentation analysis of the dome, as shown in FIGS. 3-4. It should be noted that the object extraction associated with FIG. 4 does not utilize multiple scales or scale-invariant boundaries (i.e., ScISR edge techniques) to identify object and is meant to illustrate how superpixel segmentation alone can be used to identify simple objects. As further discussed below, this method can be fraught with error and inaccuracies, making the ScISR edge techniques described herein a significantly more accurate and preferred method of object identification and extraction.

Figure 5:
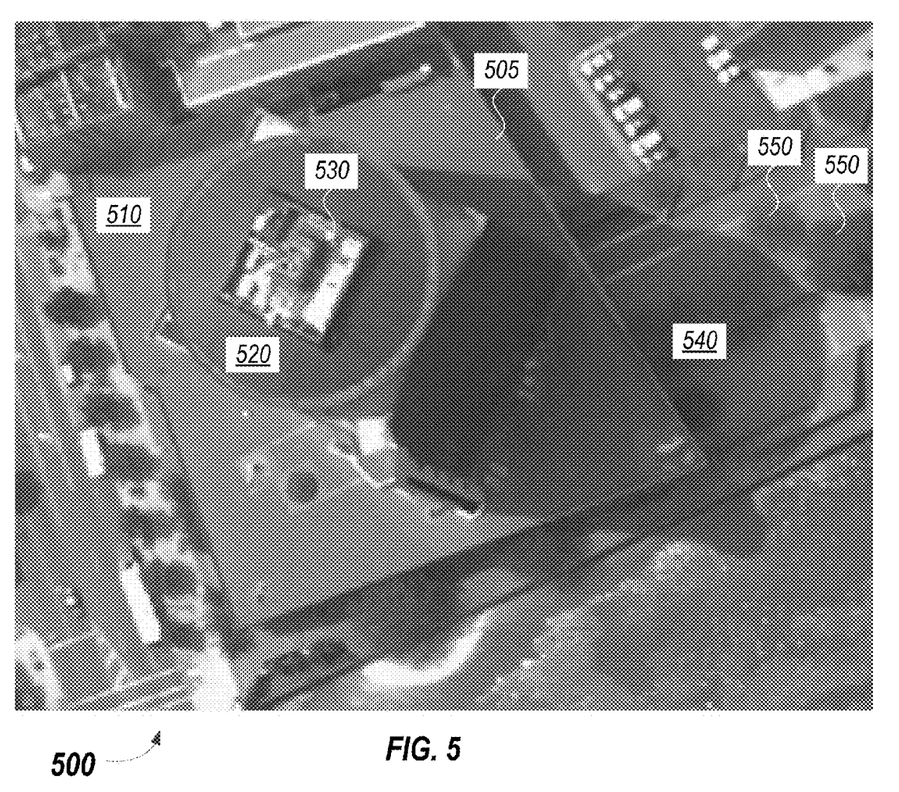
FIG. 5 depicts an image of an aerial view of a building selected for image segmentation and object extraction, according to certain embodiments of the invention.
Figure 6A:
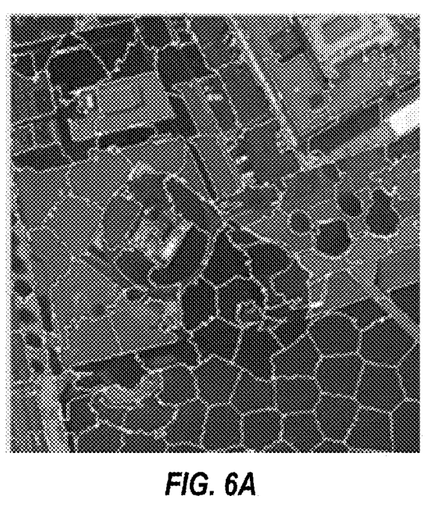
FIG. 6A illustrates aspects of image segmentation using a segmentation pattern with extra-large sized superpixels on an image, according to certain embodiments of the invention.
Figure 6B:
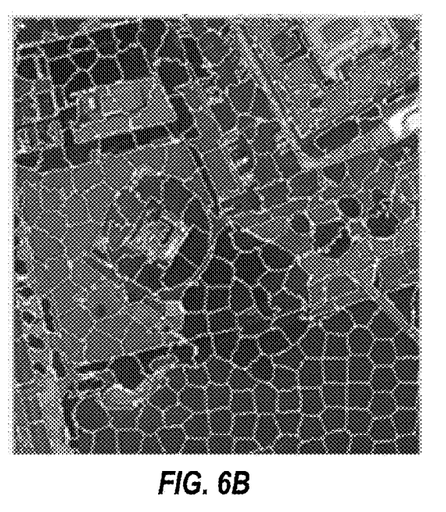
FIG. 6B illustrates aspects of image segmentation using a segmentation pattern with large sized superpixels on an image, according to certain embodiments of the invention.
Figure 6C:
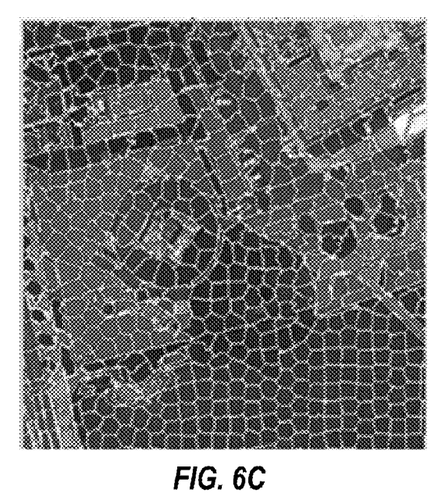
FIG. 6C illustrates aspects of image segmentation using a segmentation pattern with medium sized superpixels on an image, according to certain embodiments of the invention.
Figure 6D:
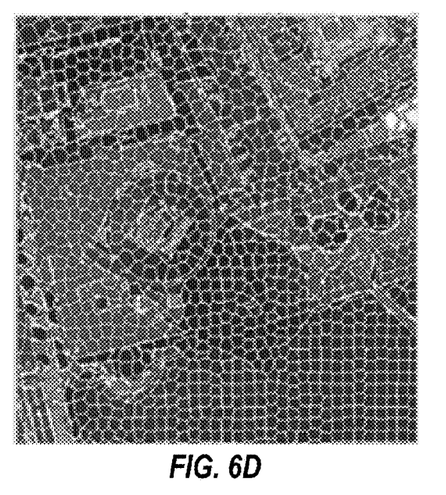
FIG. 6D illustrates aspects of image segmentation using a segmentation pattern with small sized superpixels on an image, according to certain embodiments of the invention.

FIG. 5 depicts an image 500 of an aerial view of a building 505 selected for image segmentation and object extraction, according to certain embodiments of the invention. Building 505 includes rectangular base 510 with a round dome 520 structure on the roof. Other features including trees 550 and roads 560 are shown around the base 510 of the building. In addition, building 505 includes a variety of smaller objects (e.g., HVAC infrastructure 530) that are located on the top of the building itself and scattered around the scene. Finally, image 500 contains a number of trees 550 and a large shadow 540 cast by building 505 and dome 520, adding even more complexity to the image 500. Embodiments of the invention utilizing ScISR edge analysis can differentiate and extract the individual features (e.g., building base 510, dome 520, shadow 540, trees 550, etc.) with excellent accuracy for objects of any size or shape by analyzing, e.g., spectral characteristics of image pixels, and aggregating (e.g., superimposing) superpixel segmentation patterns, over a number of scales.

FIGS. 6A-6D illustrate aspects of image segmentation using segmentation patterns with varying sized superpixels (i.e., scales) on an image, according to certain embodiments of the invention. Superpixels can vary significantly in size and can depend on the range or magnitude of scale, the homogeneous or heterogeneous nature of pixel characteristics (e.g., small differences in spectral characteristics, such as a body of water, may yield large segmentation patterns), the sensitivity of the algorithm for detecting differences in pixel characteristics (e.g., high sensitivity may detect very small variations in spectral characteristics, resulting in small superpixels), and hybridizations thereof. FIGS. 6A-6D depict 500 with segmentations patterns that comprise superpixels ranging from extra-large to small superpixels, according to certain implementations of the invention. In some embodiments, multiple pixel characteristics can be used to determine a segmentation pattern. In some cases, multiple images may be used, segmented, and superimposed to determine ScISR edges and perform object extraction.

A careful review of FIGS. 6A-6D will show that certain superpixel boundaries exist at each scale (or sensitivity factor). For example, the outline of the edge of the base 505 and dome 520 of building 510 can readily be seen in each scale shown. The superposition of each scale is depicted in FIG. 7.

Figure 7:
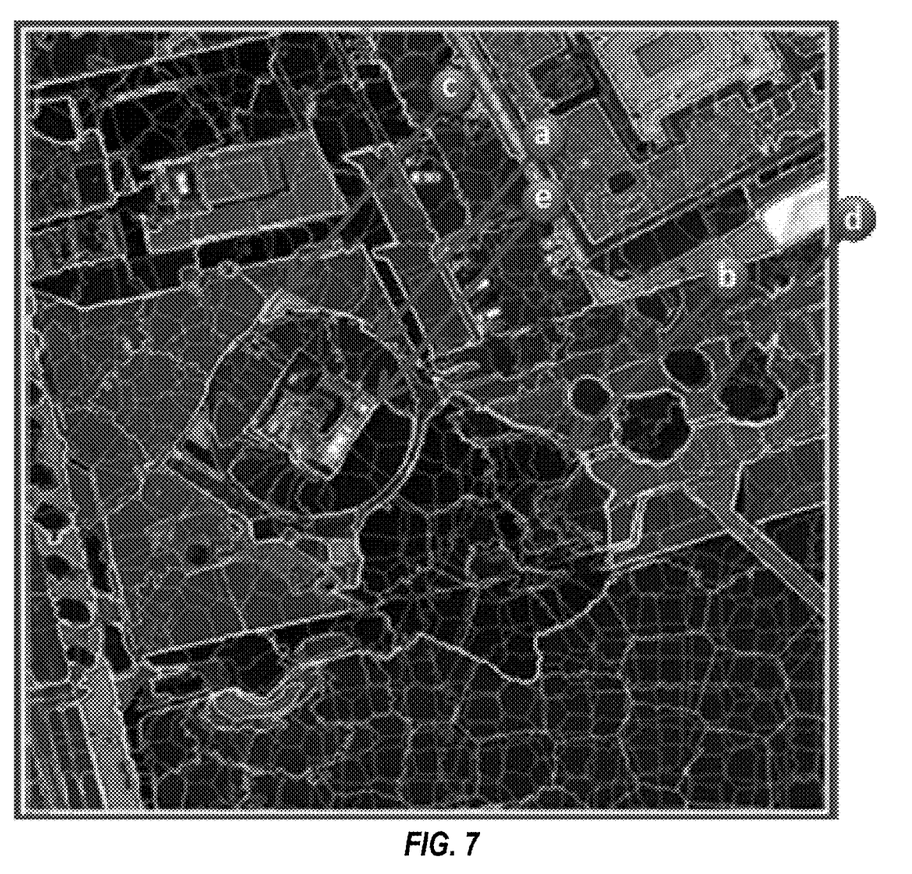
FIG. 7 illustrates aspects of object extraction via superpixel aggregation, according to certain embodiments of the invention.

FIG. 7 illustrates aspects of object extraction via superpixel aggregation, according to certain embodiments of the invention. By way of example, it may be shown that in FIG. 7 it is desirable to segment out the following objects in the scene, including but not limited to: (a) the dome of the building; (b) the shadow of the building; (c) the roof of the building (which is square in shape); (d) the trees; and (e) the roof area for air conditioning appliances and other infrastructure. Scale-invariant edges, or multiple overlapping superpixel edges that exist over a number of scales, show up as bright white lines, while non-overlapping edges, or edges that only exist at one scale or few scales, are dimmer. Even without computer-aided algorithms and sensitive spectral and spatial analysis, one can readily see white bolded outlines of the dome (a), shadow (b), the room of the building (c), the trees (d), and the roof area (e). As discussed above, straight lines and corners tend to be scale-invariant, rendering many man-made structures easily detectable using ScISR edge detection. For example, one can readily identify streets, adjacent buildings, equipment on the roof, and other structures with the naked eye.

Figure 8:
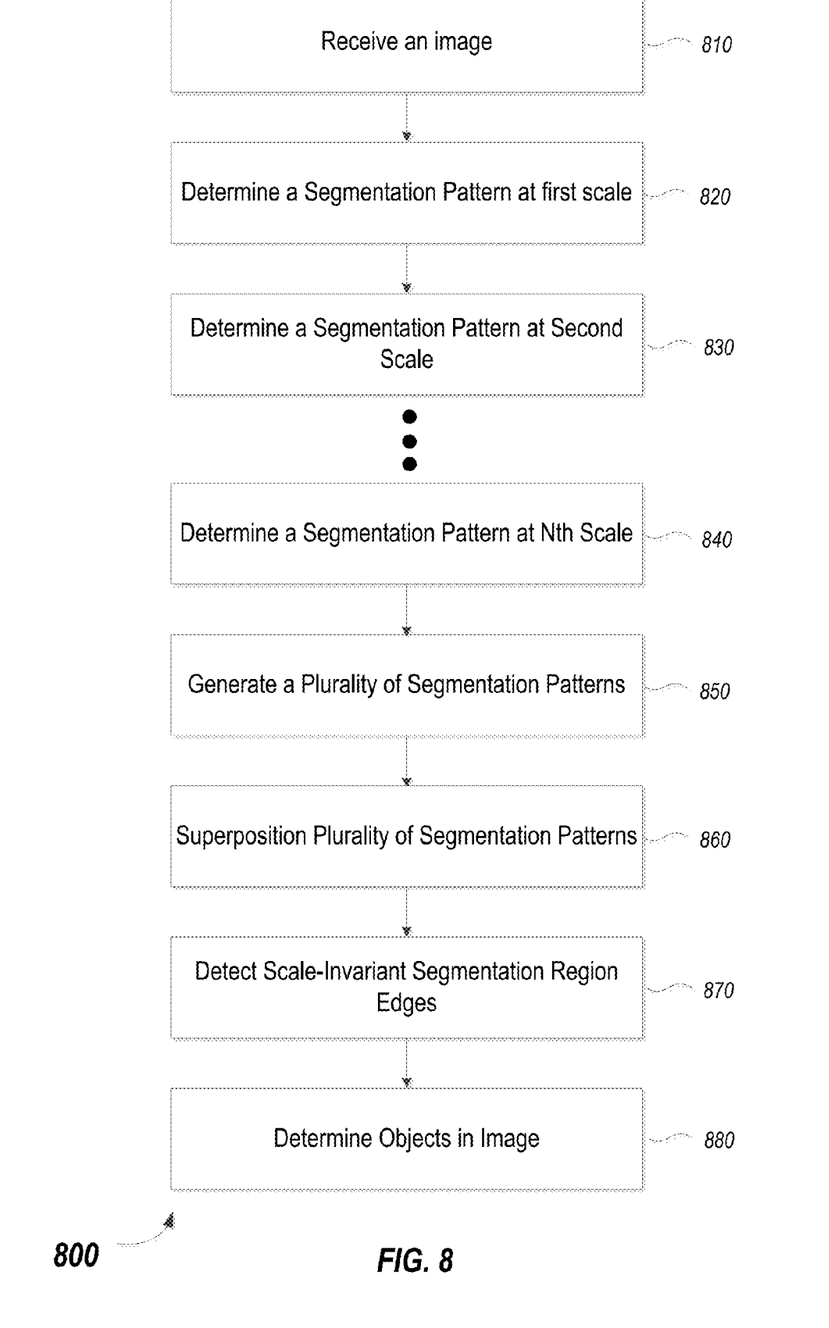
FIG. 8 is a simplified flow diagram illustrating aspects of a method for identifying objects in an image using scale-invariant superpixel region edges (ScISR), according to certain embodiments of the invention.

FIG. 8 depicts a simplified flow diagram illustrating aspects of a method 800 for identifying objects in an image using scale-invariant superpixel region edges (ScISR), according to certain embodiments of the invention. Method 800 can be performed by processing logic that may comprise hardware (e.g., circuitry, dedicate logic, etc.), software (e.g., executed on a general purpose computing system or a dedicated machine), firmware (e.g., embedded software), or any combination thereof. In some embodiments, method 800 can be performed by elements of system 900 or system 1000 of FIGS. 9-10.

Method 800 begins with receiving an image of a region of interest (810) and determining a segmentation pattern at a first scale (820) to divide the image into a plurality of segments (superpixels). The segmentation pattern can include a number of interconnected and/or adjacent superpixels that cover the entire image or a subset thereof. In some instances, there may be multiple segmentation patterns on a single image. For example, there may only be interest in segmenting some portions of the image (e.g., downtown district) while ignoring other portions of the image (e.g., marsh lands). Each of the superpixels can be formed based on spectral characteristics, sensitivity factors (e.g., grouping based on spectral characteristic threshold values), other known method of pixel differentiation, or combinations thereof. In some implementations, superpixels within superpixels may be identified (see e.g., FIG. 4 dome structure). For instance, some segmentation patterns may highlight and delineate a building structure from its adjacent landscape (e.g., identify the building as one superpixel) and still maintain a segmentation pattern therein to identify its smaller features (e.g., windows, arches, etc.). The first scale can be any suitable scale of a plurality of scales that are manually or automatically selected that are typically based on a target object or set of objects. For example, different scales and ranges may be used to capture a number of buildings versus capturing details of a single house. The preferred combinations and permutations would be understood by those of ordinary skill in the art with the benefit of this disclosure.

Method 800 proceeds with determining a segmentation pattern(s) at a second scale (830) and so on until the Nth scale (840). Segmentation patterns are generated (850) for one or more of the first through nth scales generates a plurality of segmentation patterns. Method 800 continues with superpositioning the segmentation patterns of superpixel regions at each scale or a subset thereof (860) and identifying scale-invariant superpixel region edges based on the aggregated segmentation patterns (870).

Method 800 concludes with determining one or more objects in the image based on the overlapping ScISR edges (880). Superpixel edges that do not exist at multiple scales (or compactness factors) can be ignored (or assigned a low priority), leaving a number of ScISR edges that can accurately correspond to the boundaries of objects in the image. Typically, man-made structures such as buildings, roads, and other artificial constructs, comprise more scale-invariant features (straight lines, corners, etc.) than natural objects (e.g., trees, rocks, etc.), making them easier to detect. In some case, scale-invariance may exist over some, but not all scales or compactness factors.

It should be appreciated that the specific steps illustrated in FIG. 8 provide a particular method of identifying objects in an image using ScISR edges, according to an embodiment of the present invention. Other sequences of steps may also be performed according to alternative embodiments. In certain embodiments, method 800 may perform the individual steps in a different order, at the same time, or any other sequence for a particular application. For example, alternative embodiments may include additional steps to identify and differentiate pixel characteristics and compare multiple aggregated segmentation patterns based on different combinations of pixel or image characteristics. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method.

Multi-Discipline Applications of ScISR Edge Techniques and Embodiments Thereof

As identifiable polygons may be extracted from a ScISR Edge calculation, polygons can be extracted from multiple images of the same object from different angles, such that the ScISR Edges, or in this case ScISR polygons, can be used to create a three-dimensional (3-D) image. Certain embodiments of the invention may be useful in the creation of an accurate foundation for building 3-dimensional models from imagery. Further, ScISR Polygons may be used in the creation of a broad range of classification schemes, as would be appreciated by one of ordinary skill in the art with the benefit of this disclosure.

In certain embodiments, ScISR Edge techniques may be utilized to fully segment an image, or a set of images, in a way that completely captures the salient information contained in the image(s). This method of selecting and identifying all salient data is a feature that can be implemented by selecting any appropriate computer vision algorithm and using that algorithm in conjunction with the disclosed invention. A non-exhaustive list of salient imagery data that may be captured with this method includes image data that is detectable by analysis of an image's spectral characteristics, intensity, scale, and spatial distribution.

In further embodiments, ScISR edges can also be readily adapted to isolate and highlight any arbitrary subset of image data, thus effectively filtering out unnecessary information, which fulfills a critically felt need of computational and energy efficient image segmentation. Those skilled in the art with the benefit of this disclosure will recognize that such a filtering technique may be implemented using standard techniques and provides a highly customizable method of targeted image collection. An implementation of ScISR Edges techniques may be used to efficiently filter out desired information by identifying image features of a given shape or size. After such features are identified, standard methods may be used to filter out those features. It will be apparent that many standard methods, including but not limited to, machine learning, user-guided methods, and image pre-selection may use this technique. In further embodiments, images can be filtered by size. For example, pixel area can be used to differentiate the size of an object, however other methods of object differentiation may be used.

The computational optimization methods disclosed herein (e.g., ScISR edges) can have a light weight computational footprint and may be readily configured to run on mobile computing platforms such as mobile phones and tablets. The disclosed computational optimizations offer great advantages in power usage and reduced calculation time. The embodiments described herein can be integrated into any mobile data collection or data mapping technologies (e.g., geographic information systems "GIS"), including but not limited to, "ArcPad," "ArcGIS Mobile," and the like. Additionally, other mobile tools, both related to GIS and in completely separate fields, can be integrated with the embodiments described herein for efficient analysis and object extraction of imagery data.

It should be noted that the embodiments described herein are not limited to the analysis of the structure of large objects such as buildings. The systems and methods disclosed are equally applicable to images on any scale. By way of example, researchers in the field of biomedical imagery have long sought techniques to segment out elements of interest. The disclosed invention offers an efficient, extensible, and precise method for detecting areas of interest in biomedical imagery. Any number of boundaries present in biological imagery may be calculated, including but not limited to, the edges of cells, the internal structures present in may eukaryotes, boundaries identifiable by fluorescently tagged proteins, or other methods that would be appreciated by those of skill in the art.

A further example of ScISR Edges techniques use in biomedical settings is in the detection of biomechanical motion in studies of cell mobility or endocytosis. Methods of accurate, fault tolerant, and predictive image segmentation have long been sought in these fields as image focus problems are often a cause of significant errors in image analysis. ScISR Edge techniques provide a fault tolerant solution that may be used to efficiently and accurately segment a desired image (biomedical, or otherwise). Further, the ScISR Polygons technique may be used to create a 3-D model of the desired cellular effects under analyses.

Moreover, ScISR Edges techniques allows for both a qualitative and quantitative analysis of any arbitrarily selected imagery feature. Traditional image analysis techniques suffered from problems of minimizing bias and selectivity, making them unsuitable for either the quantity of a given set of objects or analyzing the likelihood that all such objects—and only the desired objects—were selected. Some embodiments of ScISR Edges can be implemented such that a full accounting of a given set of objects is readily obtainable. Thus, a full quantitative analysis can be achieved.

The overlapping analysis inherent in ScISR Edges techniques the ability to select a qualitative detection threshold at any desired level of selectivity. Errors from bias are mitigated by the independent calculation of each ScISR Edge iteration and may be further mitigated by the use of overlapping imagery. The use of overlapping imagery or of redundant imagery may be readily adapted to optimize the analysis provided by the ScISR Edge technique, as would be appreciated by one of ordinary skill in the art with the benefit of this disclosure Further non-limiting uses of ScISR Edge techniques includes the detection of geological areas of interest. Satellite and other forms of overhead imagery are often used as sources of broad geological data. ScISR Edge techniques and embodiments thereof can be used to highlight areas of unique spectral intensity. Such areas may correspond to geological features such as river basins, floods, lava flows, open fields, or more. Additionally, areas of crop damage, new forest growth, and desert expansion may also be identified by their unique spectral signature. Those of ordinary skill in the art could identify the broad usefulness of the disclosed ScISR Edge methods, systems, and techniques in many different scientific disciplines.

ScISR Edge methods and implementations thereof can be adapted to filter by size in addition to more conventional methods of filtering by pixel area. In some implementations, filtering by size can be used to remove all objects of a predetermined size. By way of example, consider a GIS analyst who is analyzing forestry imagery to determine the health of newly planted trees. Such an analyst may use the disclosed techniques to filter out objects of sizes that correspond to fully grown trees. This filtering allows the GIS analyst to focus their research on the smaller trees at the heart of their research. Other methods of size analysis may also be used with the disclosed invention to equal effect. It should be understood that the examples provided above are provided solely by way of example and is in no way limiting on the actual use of the disclosed invention.

Embodiments of the invention are not limited to the detection of one feature or one size of features. For example, ScISR Edge techniques can capture structural information where the structure of interest is encapsulated within another object. FIG. 7 illustrates one implementation of this technique where the structure of equipment located on the top of the building (e.g., HVAC equipment, etc.) is segmented out in addition to the segmentation of the building itself. Thus, ScISR Edge techniques can be used to detect encapsulated objects of interest while simultaneously detecting exterior objects. Even simple images like that of FIG. 3 often contain significant unique structural information. An implementation of ScISR Edge techniques can capture both the dome and the other salient features of the image. Put in more general terms, by using a range of scales and/or pixel characteristic sensitivities, ScISR Edge techniques can be used to generate a segmentation patterns (superpixels) in an image, segmentation patterns (smaller superpixels) within each of the larger superpixels, and further still segmentation patterns within each of the smaller superpixels, ad infinitum, being limited only by the level of scale used or the sensitivity (compactness factor) to the pixel characteristics.

Embodiments of the invention provide a powerful tool for use in the analysis of complex imagery. Conventional methods are limited to the analysis of features of a similar scale. ScISR Edges allows one skilled in the art to capture a much richer field of detail in the analysis of an image or set of images. One non-limiting example is the use of the ScISR Edge techniques to analyze all rooftop HVAC units in a region. Traditional methods would require that an expert bifurcate the analysis to determine first which objects in an image are roofs and second which of the identified roofs enclose HVAC images. In contrast, the ScISR Edges allow a user to perform both techniques simultaneously.

Furthermore, the ability to fully capture the rich complexity present in imagery allows a GIS (Geographic Information Systems) expert to perform much more detailed and granular analysis of both presently archived imagery and future image collections. By way of example, various ScISR Edge techniques allow an analyst to capture structural data for any arbitrary features(s) present in a set of images of a housing complex. Thus a full accounting of the number of houses present may be easily accomplished as well as a simultaneous analysis of the number and shape of doors and windows within each house. Experts in GIS will readily realize that the present invention works efficiently with shape files to capture and store relevant GIS data amongst other types of pre-stored data.

The various embodiments provided herein are presented only by way of example and are in no way limiting to the broad range of applications and scientific disciplines that ScISR Edge techniques can be utilized.

Sample Embodiments of System Architectures

Figure 9:
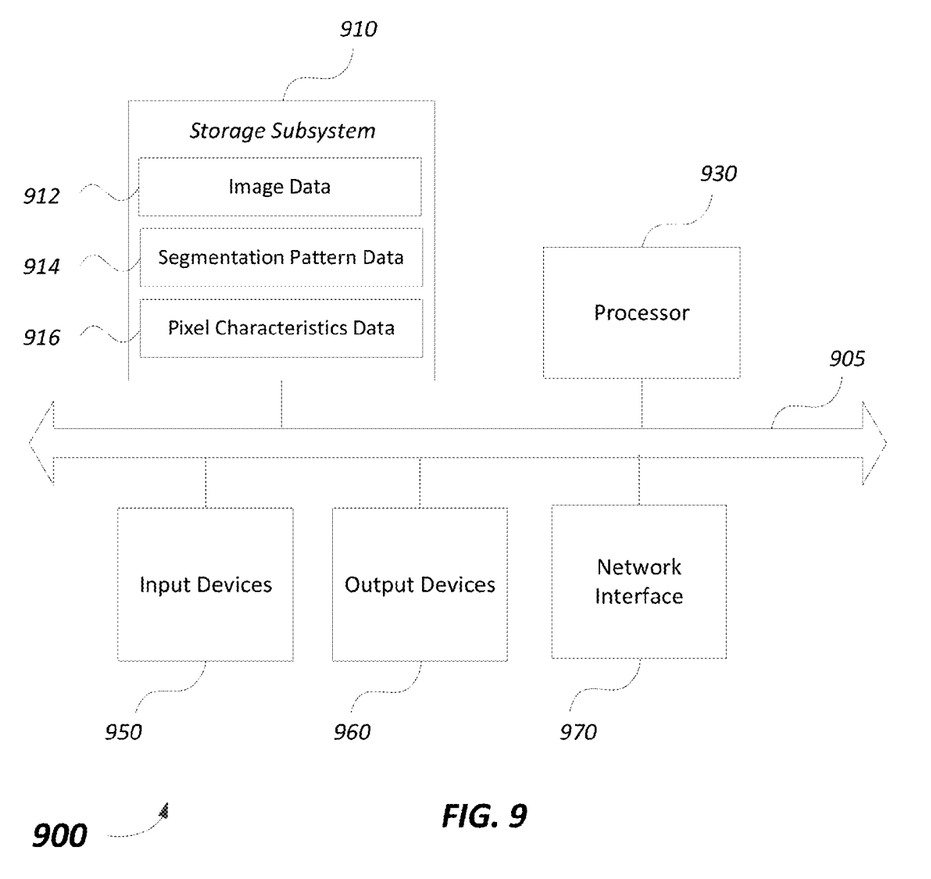
FIG. 9 illustrates a computer system for performing aspects of image segmentation, according to certain embodiments of the invention.

FIG. 9 illustrates a computer system 900 for identifying objects in an image using scale-invariant superpixel region edges (ScISR), according to certain embodiments of the invention. The image processing, algorithms, and methods described herein (e.g., FIGS. 1-7) can be implemented within a computer system such as computer system 900 shown here. Computer system 900 can be implemented as any of various computing devices, including, e.g., server(s), a desktop or laptop computer, tablet computer, smart phone, personal digital assistant (PDA), or any other type of computing device, not limited to any particular form factor. Computer system 900 can include processing unit(s) 930, storage subsystem 910, input devices 950 (e.g., keyboards, mice, touchscreens, etc.), output devices 960 (e.g., displays, speakers, tactile output devices, etc.), network interface 970 (e.g., RF, 4G, EDGE, WiFi, GPS, Ethernet, etc.), and bus 905 to communicatively couple the various elements of system 900 to one another.

Processing unit(s) 930 can include a single processor, multi-core processor, or multiple processors and may execute instructions in hardware, firmware, or software, such as instructions stored in storage subsystem 910. The storage subsystem 910 can include various memory units such as a system memory, a read only memory (ROM), and permanent storage device(s) (e.g., magnetic, solid state, or optical media, flash memory, etc.). The ROM can store static data and instructions required by processing unit(s) 930 and other modules of the system 900. The system memory can store some or all of the instructions and data that the processor needs at runtime.

In some embodiments, storage subsystem 910 can store one or more of data or software programs to be executed or controlled by processing unit(s) 930, such as image data 912, segmentation pattern data 914, or pixel characteristic data 916, as further described above with respect to FIGS. 1-7. As mentioned, "software" can refer to sequences of instructions that, when executed by processing unit(s) 930, cause computer system 900 to perform certain operations of the software programs. The instructions can be stored as firmware residing in read only memory and/or applications stored in media storage that can be read into memory for processing by processing unit(s) 930. Software can be implemented as a single program or a collection of separate programs and can be stored in non-volatile storage and copied in whole or in part to volatile working memory during program execution. From storage subsystem 910, processing unit(s) 930 can retrieve program instructions to execute in order to execute various operations (e.g., interpolations) described herein.

It will be appreciated that computer system 900 is illustrative and that variations and modifications are possible. Computer system 900 can have other capabilities not specifically described here in detail (e.g., GIS technologies). Further, while computer system 900 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 10:
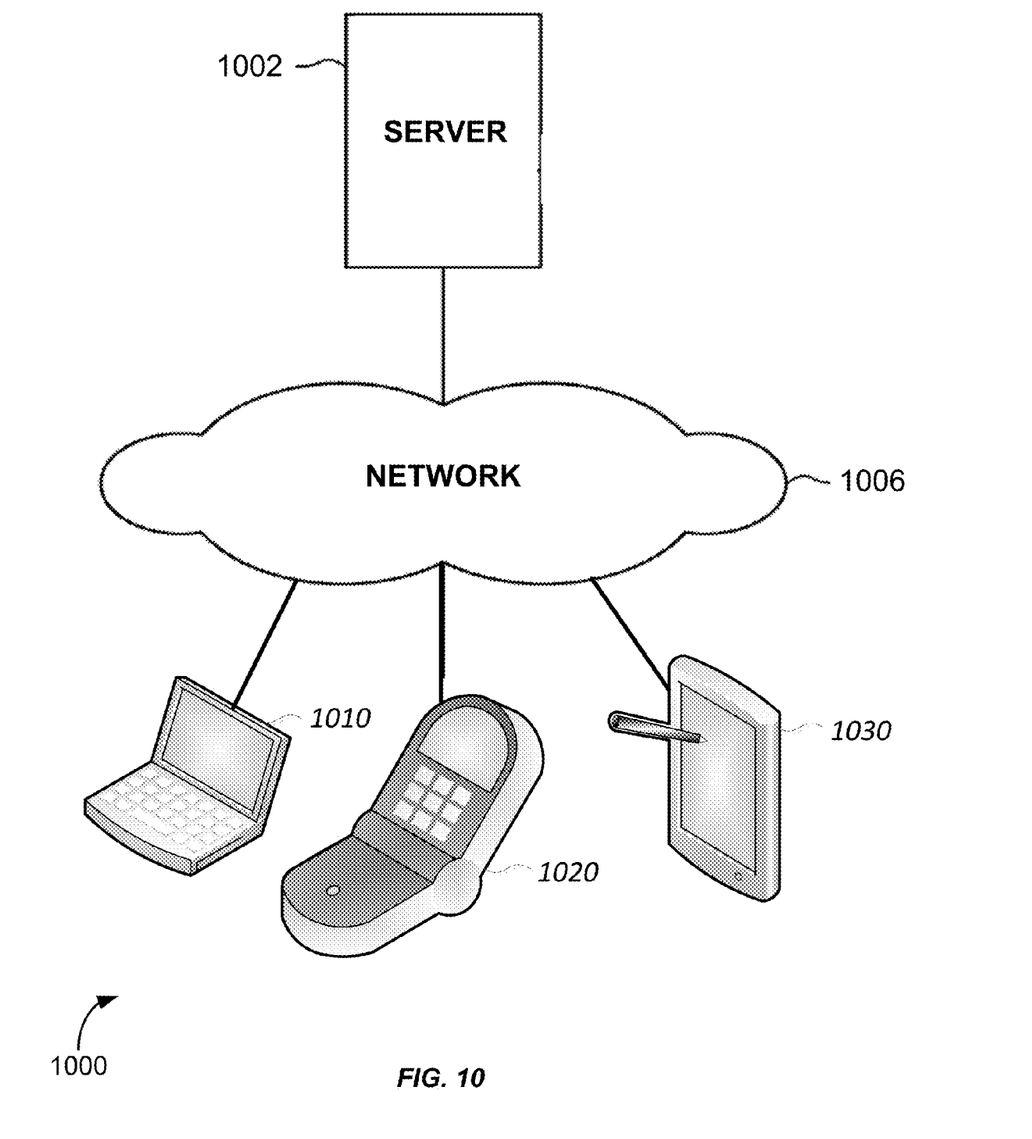
FIG. 10 depicts a simplified diagram of a distributed system for providing a system and method for performing aspects of image segmentation, according to certain embodiments of the invention.

Aspects of system 900 may be implemented in many different configurations. In some embodiments, system 900 may be configured as a distributed system where one or more components of system 900 are distributed over one or more networks in the cloud. FIG. 10 depicts a simplified diagram of a distributed system 1000 for providing a system and method for identifying objects in an image using ScISR Edge techniques, according to an embodiment of the invention. In the embodiment depicted in FIG. 10, system 1000 is provided on a server 1002 that is communicatively coupled with one or more remote client devices 1010, 1020, 1030 via network 1006.

Network 1006 may include one or more communication networks, which could be the Internet, a local area network (LAN), a wide area network (WAN), a wireless or wired network, an Intranet, a private network, a public network, a switched network, or any other suitable communication network or combination thereof. Network 1006 may include many interconnected systems and communication links including but not restricted to hardwire links, optical links, satellite or other wireless communications links, wave propagation links, or any communication protocol. Various communication protocols may be used to facilitate communication of information via network 1006, including but not restricted to TCP/IP, HTTP protocols, extensible markup language (XML), wireless application protocol (WAP), proto-cols under development by industry standard organizations, vendor-specific protocols, customized protocols, and others as would be appreciated by one of ordinary skill in the art. In the configuration depicted in FIG. 10, aspects of system 800 may be displayed on any of client devices 1010, 1020, 1030.

In the configuration depicted in FIG. 10, system 900 is remotely located from client devices 1010, 1020, 1030. In some embodiments, server 1002 may perform the methods of determining (or interpolating) a population over a geographic area described herein. In some embodiments, the services provided by server 1002 may be offered as web-based or cloud services or under a Software as a Service (SaaS) model, as would be appreciated by one of ordinary skill in the art.

While the invention has been described with respect to specific embodiments, one of ordinary skill in the art will recognize that numerous modifications are possible. Thus, although the invention has been described with respect to specific embodiments, it will be appreciated that the invention is intended to cover all modifications and equivalents within the scope of the following claims.

The above disclosure provides examples and aspects relating to various embodiments within the scope of claims, appended hereto or later added in accordance with applicable law. However, these examples are not limiting as to how any disclosed aspect may be implemented.

All the features disclosed in this specification (including any accompanying claims, abstract, and drawings) can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, sixth paragraph. In particular, the use of "step of" in the claims herein is not intended to invoke the provisions of 35 U.S.C. §112, sixth paragraph.

What is claimed is:

1. A computer implemented method comprising:
analyzing an image over a plurality of different scales, wherein analyzing includes:
determining spectral characteristics of the image at each of the plurality of different scales;
determining spatial characteristics of the image at each of the plurality of different scales;
determining a segmentation pattern for the image at each of the plurality of different scales based on the spectral and spatial characteristics of that particular scale; and
identifying objects in the image based on portions of the segmentation patterns that are scale-invariant over the plurality of different scales,
wherein each of the segmentation patterns includes a plurality of segments, each segment having a boundary, and wherein identifying objects in the image further includes:
super-positioning the segmentation patterns determined at each of the plurality of different scales; and
determining which of the boundaries or portions thereof are overlapping over one or more of the super-positioned segmentation patterns, wherein the portions of the segmentation patterns that are scale-invariant correspond to the overlapping boundaries or portions thereof.

2. The method of claim 1, further comprising:
determining statistical characteristics of the image at each scale,
wherein determining the segmentation pattern for the image at each scale is further based on the statistical characteristics.

3. The method of claim 1, further comprising:
determining texture characteristics of the image at each scale,
wherein determining the segmentation pattern for the image at each scale is further based on the texture characteristics.

4. The method of claim 1, further comprising:
determining texture characteristics, statistical characteristics, and intensity characteristics of the image at each scale,
wherein determining the segmentation pattern for the image at each scale is further based on the texture characteristics, statistical characteristics, and intensity characteristics.

5. A computer-implemented system, comprising:
one or more processors; and
one or more non-transitory computer-readable storage mediums containing instructions configured to cause the one or more processors to perform operations including:
analyzing an image over a plurality of different scales, wherein analyzing includes:
determining spectral characteristics of the image at each of the plurality of different scales;
determining spatial characteristics of the image at each of the plurality of different scales;
determining a segmentation pattern for the image at each of the plurality of different scales based on the spectral and spatial characteristics of that particular scale; and
identifying objects in the image based on portions of the segmentation patterns that are scale-invariant over the plurality of different scales,
wherein each of the segmentation patterns includes a plurality of segments, each segment having a boundary, and wherein identifying objects in the image further includes:
super-positioning the segmentation patterns determined at each of the plurality of different scales;
determining which of the boundaries or portions thereof are overlapping over one or more of the super-positioned segmentation patterns, wherein the portions of the segmentation patterns that are scale-invariant correspond to the overlapping boundaries or portions thereof.

6. The system of claim 5, further comprising:
determining statistical characteristics of the image at each scale,
wherein determining the segmentation pattern for the image at each scale is further based on the statistical characteristics.

7. The system of claim 5, further comprising:
determining texture characteristics of the image at each scale,
wherein determining the segmentation pattern for the image at each scale is further based on the texture characteristics.

8. The system of claim 5, further comprising:
determining texture characteristics, statistical characteristics, and intensity characteristics of the image at each scale,
wherein determining the segmentation pattern for the image at each scale is further based on the texture characteristics, statistical characteristics, and intensity characteristics.

9. The system of claim 5, wherein a range of the plurality of different scales that are used is based on a size of one or more target objects in the image.

10. A non-transitory computer-program product, tangibly embodied in a machine-readable non-transitory storage medium, including instructions configured to cause a data processing apparatus to:
analyze an image over a plurality of different scales, wherein analyzing includes:
determine spectral characteristics of the image at each of the plurality of different scales;
determine spatial characteristics of the image at each of the plurality of different scales;
determine a segmentation pattern for the image at each of the plurality of different scales based on the spectral and spatial characteristics of that particular scale; and
identify objects in the image based on the portions of the segmentation patterns that are scale-invariant over the plurality of different scales,
wherein each of the segmentation patterns includes a plurality of segments, each segment having a boundary, and wherein identifying objects in the image further includes instructions configured to cause the data processing apparatus to:
super-position the segmentation patterns determined at each of the plurality of different scales;
determine which of the boundaries or portions thereof are overlapping over the one or more super-positioned segmentation patterns, wherein the portions of the segmentation patterns that are scale-invariant correspond to the overlapping boundaries or portions thereof.

11. The computer-program product of claim 10, further comprising instructions configured to cause the data processing apparatus to:
determine statistical characteristics of the image at each scale,
wherein determining the segmentation pattern for the image at each scale is further based on the statistical characteristics.

12. The computer-program product of claim 10, further comprising instructions configured to cause the data processing apparatus to:
determine texture characteristics of the image at each scale,
wherein determining the segmentation pattern for the image at each scale is further based on the texture characteristics.

13. The computer-program product of claim 10, further comprising instructions configured to cause the data processing apparatus to:
determine texture characteristics, statistical characteristics, and intensity characteristics of the image at each scale,
wherein determining the segmentation pattern for the image at each scale is further based on the texture characteristics, statistical characteristics, and intensity characteristics.

14. The computer-program product of claim 10, wherein a range of the plurality of different scales that are used is based on a size of one or more target objects in the image.

* * * * *